United States Patent [19]

Crane et al.

[11] 3,966,487

[45] June 29, 1976

[54] PYROLIZATION

[75] Inventors: Grant Crane; Edward Leo Kay, both of Akron, Ohio

[73] Assignee: The Firestone Tire & Rubber Company, Akron, Ohio

[22] Filed: May 24, 1974

[21] Appl. No.: 473,014

Related U.S. Application Data

[63] Continuation of Ser. No. 236,169, March 20, 1972, abandoned.

[52] U.S. Cl. .............................. 106/307; 423/449; 423/461
[51] Int. Cl.² ...................... C09C 1/44; C09C 1/48
[58] Field of Search ...................... 106/307, 288 B; 423/461, 449; 201/2, 5, 25

[56] References Cited
UNITED STATES PATENTS

| | | | |
|---|---|---|---|
| 3,644,131 | 2/1972 | Gotshall | 106/307 |
| 3,704,108 | 11/1972 | Alpert | 423/461 |
| 3,772,242 | 11/1973 | Lisha et al. | 260/683 R |
| 3,822,218 | 7/1974 | Whittaker et al. | 106/307 |
| 3,823,224 | 7/1974 | Rahman et al. | 106/307 |

*Primary Examiner*—Helen M. McCarthy
*Assistant Examiner*—J. V. Howard

[57] ABSTRACT

The invention relates to the process for recovery of carbon black of controlled quality from scrap-rubber vulcanizates. Scrap rubber is selected on the basis of the quality of the carbon black used in the preparation of the rubber from which the scrap is obtained. The scrap is continuously pyrolized to produce a product composed largely of the carbon black originally present in the scrap. The recovered carbon black is ground and may be used as a reinforcing agent as such, or optionally it may be pelletized to facilitate handling.

2 Claims, No Drawings

PYROLIZATION

This is a continuation, of application Ser. No. 236,169 filed Mar. 20, 1972, now abandoned.

The invention relates to carbon black produced by pyrolizing selected scrap rubbers. It includes the process as well as the product and rubbers in which the product is used as a reinforcing agent.

According to this invention, the selection of scrap for calcination to produce a reinforcing agent is dependent upon the types of carbon black the scrap contains, because the char obtained is largely composed of the carbon black in the scrap. By selecting the scrap that is calcined on the basis of the carbon black it contains, a char product suitable for a particular type of reinforcement is obtained. The reinforcing property of any particular char may be improved by subsequent treatment.

For instance, Gotshall Pat. No. 3,644,131 describes the treatment of scrap-rubber char with oil to produce a reinforcing agent. Various other treatments have been proposed and others will be proposed for the preparation of reinforcing agents as the disposal of scrap rubber by calcination is further studied. In any of these procedures, the nature of the reinforcing agent produced can be controlled by selecting the scrap utilized on the basis of the carbon black which it contains.

To illustrate, scrap rubbers which are essentially worn tire treads, contain valuable carbon black which can be recovered by charring the scrap, and this char can be re-used as a high-quality black in the reinforcement of tires. The scrap from the carcass portion of a tire does not contain this valuable black, but a different black, and the char produced from it has other uses as a reinforcing agent. The char obtained from rubber mechanical goods is of still a different quality, but valuable for different reinforcement.

Regardless of the source of the scrap, it is treated by cutting it into pieces of a convenient size for feeding to a calciner; for example, tires are de-beaded to remove the metalbead and the resulting scrap is divided into tread scrap and carcass scrap. These scraps are separately treated. They are either cut by conventional means or "hogged" in a hammermill. It is not necessary to remove the fabric from the carcass scrap, although this may be done.

Scrap tread rubber usually contains higher quality blacks than other scrap rubber. Such blacks are known in the industry as high-abrasion-resistant blacks, such as, for example, HAF (High Abrasion Furnace) black, ISAF (Intermediate Super-Abrasion Furnace) black, and SAF (Super-Abrasion Furnace) black, etc.

The carcass of a tire—that is, the portion which includes the sidewalls, inner liner and body generally contains carbon blacks of larger particle size than the so-called tread blacks. These are generally less abrasion resistant. Such blacks are known, for example, as SRF (Semi-Reinforcing Furnace) black and GPF (General Purpose Furnace) black.

In further contrast, carbon blacks used in mechanical goods impart even less reinforcing properties to the rubbers, and are generally of lower quality. Such blacks are referred to in the industry as fillers, and may be very finely divided coal (Austin black) or very coarse thermal blacks.

In the pyrolization of scrap rubber the blacks in the rubber are largely unchanged, and a small amount of additional black which is formed by the charring operation is added to the original blacks. The charring may alter the surface of the blacks and thus affect their reinforcing and other properties, although any such change in the surface is not particularly deleterious to the effect of the original black.

In the treatment of the selected scrap rubbers of this invention, they are separately charred by heating in the substantial absence of air, at a temperature in the general range of 800° to 2500°F., and preferably at a temperature of about 1200° to 1800°F. Different types of pyrolizing equipment may be utilized. An indirect gas-fired horizontal calciner such as a Bartlett-Snow calciner is satisfactory, although vertical calciners can also be used. In the calcining operation the most important factor is the residence time of the feed. The residence time is established by the speed of rotation of the calciner tube as well as the slope of the calciner and feed rate. The operation of the calciner can be operated concurrently or countercurrently—that is, in concurrent operation the flow of scrap rubber is in the direction of the oil and gas flow; in countercurrent operation the flow of the scrap rubber is countercurrent to the oil and gas produced. That is, as the scrap rubber is pyrolized, char, oil and gas are formed. In countercurrent operation, the oil and gas are removed from the feed port. In effect, the oil and gas must flow countercurrent to the char which is removed by gravity drop at the opposite end of the calciner feed port. In addition, the temperature has to be high enough to maintain the oil and gas in the vapor state, and these products are removed in the vapor state.

The char as obtained from the calciner can be ground by conventional means such as in a ball mill, hammermill or fluid-energy mill, etc. or it may be further treated before grinding. The choice of particle-size reduction equipment is dictated on the basis of the particle size desired for the ground char black and in what application the ground char black will be utilized. If a finely ground material is desired a fluid-energy mill would have to be used. The fluid-energy mill is operated in such a manner as to obtain minimum particle size material; for example, the classifier speed and the motive fluid velocity is adjusted to get minimum size particles.

The ground black obtained from the fluid-energy mill is usually recovered in a cyclone or a filter bag, which are conventional recovery systems used in the carbon black industry. The recovered black may be used as such or, optionally, pelletized by conventional means.

The following examples are illustrative of the results of using carbon blacks obtained from scrap tread as well as whole tire scrap in the compounding in a butadiene-styrene copolymer rubber stock. Other rubber stocks might be used, such as those produced from natural rubber, polybutadiene, poly-isoprene, etc. with a similar result. Data summarizing Table I indicate the difference in the quality of the carbon black derived from tread scrap as compared to whole tire scrap. For example, the scorch time as determined by Monsanto Rheometer for the tread vulcanizates are in the order of 12½ minutes, as compared to approximately 15 minutes for the whole tire scrap vulcanizates. These scorce times compare favorably with the commercial GPF black vulcanizate. Time to optimum cure for the tread black vulcanizate is essentially equal to the GPF commercial control and is somewhat superior to the char black derived from the whole tire scrap.

Moduli and tensile strengths on the tread black vulcanizate are both superior to the whole tire scrap vulcanizate. In addition, the tread black vulcanizate is essentially equal to the GPF control relative to tensile strengths.

The state of cure of all of the vulcanizates shown in Table I are essentially equal, based on the ultimate elongation data.

TABLE I

| | Control a | Whole Tire Scrap | | Control b | Tread Scrap | |
|---|---|---|---|---|---|---|
| Black | GPF | A | B | | C | D |
| Recovered In | | Cyclone | Bag | | Cyclone | Bag |
| Monsanto Rheometer at 300°F, 1° Arc, 100 RPM | | | | | | |
| Time to scorch, minutes | 13.6 | 14.6 | 15.8 | (12.8) | 12.4 | 12.7 |
| Time to optimum (90%), cure, minutes | 33.5 | 34.6 | 39.5 | (32.0) | 31.8 | 33.1 |
| Normal Stress-Strain Properties Cured at 300°F | | | | | | |
| 300% Modulus, psi | | | | | | |
| 15' | 200 | 210 | 200 | (350) | 380 | 260 |
| 23' | 1120 | 730 | 540 | (1380) | 1110 | 930 |
| 30' | 1480 | 1160 | 1020 | (1670) | 1480 | 1260 |
| Tensile Strength, psi | | | | | | |
| 15' | 540 | 310 | 300 | (840) | 1520 | 1120 |
| 23' | 2880 | 2360 | 2620 | (2950) | 3340 | 2680 |
| 30' | 2980 | 2340 | 2640 | (3110) | 3030 | 3140 |
| Ultimate Elongation, % | | | | | | |
| 15' | 830 | 900 | 900 | (700) | 790 | 870 |
| 23' | 610 | 740 | 740 | (560) | 620 | 540 |
| 30' | 530 | 530 | 510 | (500) | 470 | 500 |

We claim:

1. The process of producing carbon black from scrap tires which comprises separating the tire treads from other parts of the tires so as to obtain scrap rubber composed essentially of tread stock and substantially free of other rubber stock, calcining said scrap rubber in the substantial absence of air and reducing the particle size of the char obtained and thus producing a char which is suitable for use as a carbon black for compounding in tire tread stock.

2. The process of producing carbon black from scrap tires which comprises separating the tire carcasses from other parts of the tires so as to obtain scrap rubber composed essentially of carcass stock and substantially free of other rubber stock, calcining said scrap rubber in the substantial absence of air and reducing the particle size of the char obtained and thus producing a char which is suitable for use as a carbon black for compounding in tire carcass stock.

* * * * *